United States Patent [19]

Chen et al.

[11] Patent Number: 4,913,822

[45] Date of Patent: Apr. 3, 1990

[54] METHOD FOR CONTROL OF SCALE AND INHIBITION OF CORROSION IN COOLING WATER SYSTEMS

[75] Inventors: Fu Chen, Newtown, Pa.; J. Michael Brown, The Woodlands, Tex.

[73] Assignee: Betz Laboratories, Inc., Trevose, Pa.

[21] Appl. No.: 296,253

[22] Filed: Jan. 12, 1989

Related U.S. Application Data

[63] Continuation-in-part of Ser. No. 201,645, Jun. 1, 1988, abandoned, which is a continuation of Ser. No. 944,160, Dec. 18, 1986, abandoned, which is a continuation-in-part of Ser. No. 37,484, Apr. 13, 1987, Pat. No. 4,759,851, which is a continuation of Ser. No. 864,049, May 16, 1986, Pat. No. 4,659,481, which is a continuation of Ser. No. 545,563, Oct. 26, 1983, abandoned.

[51] Int. Cl.$^4$ ................................................ C02F 5/14
[52] U.S. Cl. ..................................... 210/699; 210/701; 252/181; 252/389.2; 252/389.52; 252/396; 422/15; 422/17
[58] Field of Search ................................ 210/696–701; 252/180, 181, 389.2, 389.24, 389.52, 389.54, 396; 422/15, 17, 19

[56] References Cited

U.S. PATENT DOCUMENTS

| | | | |
|---|---|---|---|
| 4,209,398 | 6/1980 | Ii et al. | 210/696 |
| 4,303,568 | 12/1981 | May et al. | 422/13 |
| 4,471,100 | 9/1984 | Tsubakimoto et al. | 525/367 |
| 4,500,693 | 2/1985 | Takehara et al. | 526/240 |
| 4,560,481 | 12/1985 | Hollander | 210/701 |
| 4,659,482 | 4/1987 | Chen | 210/699 |
| 4,717,499 | 1/1988 | Chen | 252/181 |

FOREIGN PATENT DOCUMENTS 56-155692 12/1981 Japan .

OTHER PUBLICATIONS

Chemical Abstract, 99:58708x, 1983.

*Primary Examiner*—Peter Hruskoci
*Attorney, Agent, or Firm*—Alexander D. Ricci; Hill Gregory M.

[57] ABSTRACT

A method for inhibiting scale deposition and the corrosion of metal surfaces in a cooling water system.

It comprises a water soluble copolymer consisting of moities of acrylic acid and monohydroxylated alkyl allyl ether, a phosphonate compound, a water soluble zinc salt and, optionally, an azole compound, and/or a water soluble molybdate salt.

7 Claims, No Drawings

METHOD FOR CONTROL OF SCALE AND INHIBITION OF CORROSION IN COOLING WATER SYSTEMS

This is a continuation-in-part of application Ser. No. 201,645 filed on June 1, 1988 (now abandoned), which is: a continuation of application Ser. No. 944,160 filed on Dec. 18, 1986 (now abandoned), which is: a continuation-in-part of Ser. No. 037,484 filed May 13, 1987 (now U.S. Pat. No. 4,759,851) which is a continuation of Ser. No. 864,049 filed May 16, 1986 (now U.S. Pat. No. 4,659,481) which is a continuation of Ser. No. 545,563 filed Oct. 26, 1983 (now abandoned).

FIELD OF THE INVENTION

The present invention pertains to a method adapted to control the formation of mineral deposits which are in the form of scale and to inhibit corrosion in cooling water systems operating under alkaline water conditions.

BACKGROUND OF THE INVENTION

The problems of scale formation and attendant effects have troubled water systems for years. For instance, scale tends to accumulate on internal walls of various water systems, such as cooling systems, and thereby materially lessens the operational efficiency of the system.

Deposits in lines, heat exchange equipment, etc., may originate from several causes. For example, precipitation of calcium carbonate, calcium sulfate and calcium phosphate in the water system leads to an accumulation of these scale imparting compounds along or around the metal surfaces which contact the flowing water circulating through the system. In this manner, heat transfer functions of the particular system are severely impeded.

Corrosion, on the other hand, is a degradative electrochemical reaction of a metal with its environment. Simply stated, it is the reversion of refined metals to their natural state. For example, iron ore is iron oxide. Iron oxide is refined into steel. When the steel corrodes, it forms iron oxide which, if unattended, may result in failure or destruction of the metal, causing the particular water system to be shut down until the necessary repairs can be made.

Typically, in cooling water systems, the formation of calcium sulfate, calcium phosphate and calcium carbonate, among others, has proven deleterious to the overall efficiency of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeded heat transfer functions which would normally be caused by calcium phosphate deposition.

PRIOR ART

U.S. Pat. No. 4,500,693 (Takehara, et al.) discloses sundry copolymers comprised of a (meth)acrylic acid and an allylic ether monomer. In accordance with the -693 disclosure, the allylic ether monomer may be 3-allyloxy-1,2-dihydroxypropane, or may be derived from the reaction product of 3-allyloxy-1, 2-dihydroxypropane with various reagents, such as ethylene oxide, sulfuric acid, phosphorous pentoxide, propylene oxide, monoaryl sorbitan, etc. Particular attention is drawn to Example 1 of the -693 disclosure wherein an acrylic acid/3-allyloxy-1,2-dihydroxypropane copolymer is prepared. The patent further indicates that the disclosed copolymers may be used in cooling water systems as well as to provide dispersants in aqueous slurries.

U.S. Pat. Nos. 4,717,499 and 4,659,482 (both to Chen) disclose, respectively, a composition and a method for inhibiting corrosion and scale formation in alkaline cooling water systems comprising an acrylic acid/allylhydroxypropylsulfonate ether copolymer, a phosphate and a zinc compound.

U.S. Pat. No. 4,303,568 (May, et al.) discloses the use of a copolymer comprising acrylic moieties and hydroxylated lower alkyl acrylate moieties in addition to an orthophosphate to provide a protective oxide film on the metalic surfaces of water treatment equipment.

Japanese Patent No. 56-155,692 discloses copolymers of acrylic acid and polyethylene glycol monoallyl ethers. The disclosure states that these copolymers are used for dust control applications. In the -692 Japanese patent teachings, the number of moles of ethylene oxide of the allyl ether monomer must be from 5 to 100. The disclosure states that, if the number of moles is less than 5, the scale precipitating and dispersing efficacy of the block copolymer does not suffice. In accordance with the present invention, however, the allyl ether monomer is prepared by reacting only one mole of alkylene oxide with one mole of allyl alcohol, and the resulting copolymers show superior calcium phosphate deposit control efficacy.

DETAILED DESCRIPTION OF THE INVENTION

In accordance with the invention, it has been discovered that a treatment program incorporating (1) a water soluble copolymer, as shown in Formula I, (2) a water soluble zinc salt, (3) an organic-phosphorus acid compound and optionally, (4) an azole compound, and/or a water soluble molybdate salt, are effective in controlling the formation of mineral deposits and inhibiting corrosion in various cooling water systems. The program is extremely effective for water system operating at pH>8 and a Langelier Saturation Index of >0.8.

The water soluble copolymers used in the present invention have the structure:

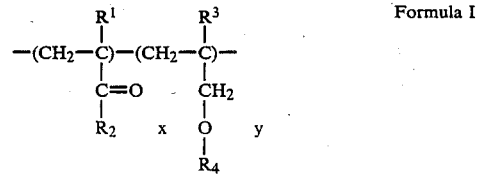

Formula I wherein R1 and R3 are independently hydrogen or lower alkyl group (C1-C3); R2 is OH or OM, or NH2; M is a water soluble cation; R4 is a monohydroxylated alkyl group of from 1 to 6 carbon atoms.

The copolymers are efficacious over a broad range of molecular weights. The number average molecular weight of the water soluble copolymers of Formula I may fall within the range of 1,000 to 1,000,000. Preferably the number average molecular weight will be within the range of from about 1,500 to 500,000. Optimization of the treatment system may be achieved by regulating the concentration of the copolymer. The key criterion is that the polymer be water soluble.

The molar ratio x:y of the monomers of Formula I may fall within the range of between about 30:1 to 1:10, with the x:y molar ratio range of from about 8:1 to 1:5 being preferred.

At present, the water soluble polymer preferred for use in cooling water systems is:

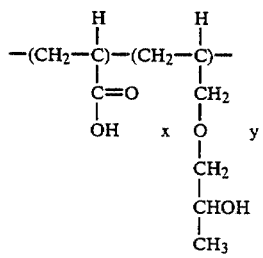

Formula II where, x is acrylic acid and y is 1-allyloxy-2-propanol (AOP). The moiety of y is also named as 2-propanol,1-(2-propenyloxy) [21460-36-6].

This polymer (Formula II) is referred to as acrylic acid/1-allyloxy-2-propanol copolymer (AA/AOP).

As to preparation of the monomer designated as x above, in Formula II, acrylic acid is well known. The allyl containing monomer y, in Formula II above, may be produced by reacting allyl alcohol with the corresponding alkylene oxide, in the temperature range of about 25°–150° C. using KOH, NaOH or other reagents as the catalyst. During the reaction, depending on the type of catalyst and reaction conditions, isomer and polyalkoxylated product may be formed. The reaction is illustrated by the following mechanism:

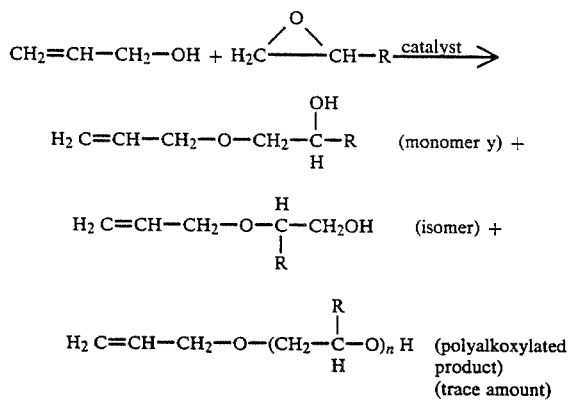

where R is hydrogen or an alkyl group (C1–C4) and n may be from 2 to 4. The isomer and polyalkoxylated material, along with unreacted allyl alcohol may be separated from the preferred monomer y by vacuum distillation or other physical means of separation. However, they can also be copolymerized with monomer x of Formula I. Therefore, it is also within the scope of this invention.

After the desired monomers have been obtained, free radical polymerization may proceed in accordance with conventional solution, precipitation or emulsion polymerization techniques. Polymerization initiators such as persulfate, peroxide and azo compounds etc. may be used. Chain transfer agents such as alcohol (preferably isopropanol), amine or mercapto compounds may be used to regulate the molecular weight of polymer. The resulting polymer may be isolated by well-known methods such as precipitation, etc. If polymerized in water, the polymer may simply be used in its aqueous solution. Polymers in accordance with the invention were prepared as per the specification of pending application Ser. No. 201,645 (of common assignment herewith).

It should be mentioned that water soluble terpolymers comprising monomers x and y of Formulae I or II may also be prepared for use as deposit control agents and/or corrosion control agents. For instance, 1-allyloxy-2-propanol may be incorporated into a water soluble terpolymer backbone having repeat units including acrylic acid, hydroxylated alkyl acrylate, alkyl acrylate monomers, methacrylic acid, acrylamide, 2-acrylamide-2-methylpropane sulfonic acid (AMPS), and 1-allyloxy-2-hydroxypropyl sulfonate ether (AHPSE), etc. It is also to be understood that minor amounts of additional monomers may be added to the polymerization recipe.

The polymers should be added to the aqueous system, for which corrosion inhibiting, and/or deposit control activity is desired, in an amount effective for the purpose. This amount will vary depending upon the particular system for which treatment is desired and will be influenced by factors such as, the area subject to corrosion, pH, temperature, water quality and the respective concentrations in the water of the potential scale and deposit forming species. For the most part, the polymers will be effective when used at levels of about 0.1–500 parts per million parts of water, and preferably from about 1.0 to 100 parts per million parts of water contained in the aqueous system to be treated. The polymers may be added directly into the desired water system in a fixed quantity and in the state of an aqueous solution, continuously or intermittently.

EXAMPLES

The invention will now be further described with reference to a number of specific examples which are to be regarded solely as illustrative, and not as restricting the scope of the invention.

Preparation of Acrylic Acid/1-Allyloxy-2-propanol Copolymer

EXAMPLE 1

A suitable reaction flask was equipped with a mechanical agitator, a thermometer, a reflux condenser, a nitrogen inlet and two addition inlets for the initiator and monomer solutions. The flask was charged with 170 g of deionized water and 30 g of isopropanol. The resulting solution was then heated to reflux under a nitrogen blanket. 43.2 g of acrylic acid (0.6 mole) and 23.2 g of 1-allyloxy-2-propanol [AOP] (94% pure, 0.19 mole) were mixed in a separate flask so as to provide a mixed monomer solution. The mixed monomer solution was then transferred to an additional funnel. An initiator solution containing 24.4% of sodium persulfate in deionized water was prepared separately and sparged with nitrogen. The initiator solution (17 g) was then added to the reaction flask along with the mixed monomer solution over a period of two hours. After this addition, some additional persulfate solution was added to the reaction mixture for one more hour at 85° C. and, subsequently, 90.0 g of the isopropanol/water solution were stripped off. The reaction mixture was then cooled to lower than 40° C. and 36 g of 50% caustic solution was then added.

The structure of the resulting copolymer was verified by Carbon 13 NMR. The polymer solution, after being diluted to 24.8% solids with water, had a Brookfield viscosity of 15.1 cps at 25° C. It was a stable solution with a slightly yellow color. The molecular weight (Mn) was 3,500 as determined by GPC.

EXAMPLE 2

Utilizing both apparatus and procedure similar to that described in Example 1, 220 g of deionized water and 35 g of isopropanol were charged to a reaction flask. The solution was then heated to reflux temperature under a nitrogen blanket. 43.2 g of acrylic acid and 23.2 g of AOP (94%) were added to a separate flask so as to provide a mixed monomer solution. The mixed monomer solution as then added to the reaction flask along with an initiator solution comprising sodium persulfate over a two hour period. The reaction mixture was heated for two more hours and subsequently 109 g of isopropanol/water solution were stripped off. The mixture was cooled to lower than 40° C. and 34 g of 50% caustic solution was added.

The resulting polymer solution, after being diluted to 24.8% solids with water, had a Brookfield viscosity of 14.7 cps (at 25° C.). The molecular weight (Mn) was 4,000 as determined by GPC.

EXAMPLE 3

Utilizing both apparatus and procedure similar to that described in Example 1, 30 g of isopropanol and 200 g of water were added to a reaction flask. 43.2 g of acrylic acid (0.6 mole) and 12 g of AOP (94%, 0.097 mole) were added to an addition funnel so as to provide a mixed monomer solution. The mixed monomer solution was then added to the reaction flask along with a sodium persulfate solution over a two hour period. One hour after this addition, some additional persulfate solution was added to the reaction mixture. The mixture was heated for one more hour and, subsequently, 95.4 g of isopropanol/water solution were stripped off. The mixture was cooled to lower than 40° C. and 39 g of 50% caustic was added.

The resulting polymer solution, after being diluted to 24.2% solids, had a Brookfield viscosity of 15.1 cps at 25° C. The structure of the copolymer was verified by Carbon 13 NMR.

EXAMPLE 4

Utilizing the apparatus and procedure described in Example 1, 43.2 g of acrylic acid (0.6 mole) and 12 g of AOP (94%, 0.097 mole) were used for copolymerization. The resulting polymer solution, after being diluted to 23.8% solids had a Brookfield viscosity of 15.7 cps (at 25° C.).

EXAMPLE 5

Utilizing an apparatus similar to that described in Example 1, 120 g of water and 12 g of AOP (94%, 0.097 mole) were added to a reaction flask, 51 g of methacrylic acid (0.6 mole) and sodium persulfate solution were then separately added to the reaction mixture in 2.5 hours at 90° C. The resulting polymer solution was further neutralized with 40 g of caustic (50%) and diluted to a 30% solid solution. The final solution had a Brookfield viscosity of 113 cps at 25° C.

EXAMPLE 6

Apparatus, procedure and reagent charge similar to that described in Example 1 were used, except this time, 23.2 g of AOP (94% pure) was initially charged into a reaction flask along with isopropanol and water. 43.2 g of acrylic acid and sodium persulfate solution was then added to the reaction flask over a period of 90 minutes. The resulting polymer solution, after isopropanol/water distillation, caustic addition and water dilution (to 24.8%) had a Brookfield viscosity of 14.8 cps at 25° C.

EXAMPLE 7

Procedure and reagent charge similar to that described in Example 6, except no isopropanol was charged. The resulting polymer solution after dilution (to 24.7%), had a Brookfield viscosity of 56.6 cps at 25° C.

EXAMPLE 8

Utilizing the apparatus and procedure as described in Example 7, except 58.1 g of allyl hydroxypropyl sulfonate ether (AHPSE, 37.5%) was also reacted with 43.2 g of acrylic acid and 11.9 g of AOP (95.2%) to form a terpolymer. The resulting polymer solution, after being diluted to 25.1%, had a Brookfield viscosity of 42.5 cps at 25° C.

EXAMPLE 9

Apparatus and procedure similar to that described in Example 6, 43.2 g of acrylic acid and 11.6 g of AOP (94%) was used for copolymerization. The resulting polymer solution had a Brookfield viscosity of 17.6 cps at 25° C. (25.2%).

Table I herein below presents a summary of the physical properties of the copolymers produced in accordance with Examples 1 through 9.

TABLE I

| Acrylic Acid/1-Allyloxy-2-Propanol (AA/AOP) Copolymer | | | | | |
|---|---|---|---|---|---|
| Copolymer | Mole Ratio AA/AOP | Solid (%) | Vis (cps) | pH | Mn |
| Ex 1 | 3.2/1 | 24.8 | 15.1 | 5.7 | 3,500 |
| Ex 2 | 3.2/1 | 24.8 | 14.7 | 5.6 | 4,000 |
| Ex 3 | 6.2/1 | 24.2 | 15.1 | 5.5 | 4,500 |
| Ex 4 | 6.2/1 | 23.8 | 15.7 | 5.6 | 4,000 |
| Ex 5* | 6.1/1 | 30.0 | 113.0 | 6.5 | — |
| Ex 6 | 3.2/1 | 24.8 | 14.8 | 6.0 | 3,000 |
| Ex 7 | 3.2/1 | 24.7 | 56.6 | 6.0 | 7,200 |
| Ex 8** | 6/1/1 | 25.1 | 42.5 | 6.0 | 7,300 |
| Ex 9 | 6.4/1 | 25.2 | 17.6 | 5.9 | 5,500 |

AA = acrylic acid
AOP = 1-allyloxy-2-propanol
AHPSE = allyl hydroxyproply sufonate ether
*Methacrylic acid/AOP copolymer
**Acrylic acid/AOP/AHPSE terpolymer
Mn, number average molecular weight, was measured by gel permeation chromatography (GPC) using Toyo Soda G-2000 SW, G-4000 SW, or Shodex OH-PAK columns calibrated with polystyrene sulfonate standards in sodium nitrate solution. Molecular weight results from GPC depend on the type of column, conditions and standards used.

DEPOSIT CONTROL ACTIVITY

The deposit control activity of these polymers was tested with the results being reported in Tables II to VI.

TABLE II

Calcium O-Phosphate Inhibition
Conditions: 600 ppm Ca as CaCO₃, 12 ppm PO₄, pH 7.0,
2 mM NaHCO₃, 70° C., 17 hours equilibration

| Example | Treatment | ppm Active | % Inhibition 5 | 10 | 20 |
|---|---|---|---|---|---|
| | AA/HPA | | 14 | 27 | 94 |
| | AA/AHPSE | | 10 | 29 | 98 |
| 1 | | | 15 | 45 | 95 |
| 2 | | | 3 | 29 | 98 |
| 3 | | | 22 | 29 | 95 |
| 4 | | | 10 | 13 | 93 |

AA/HPA = acrylic acid/2-hydroxyproplyacrylate copolymer, AA:HPA 3:1 Mn 3,000
AA/AHPSE = acrylic acid/allyhydroxyproplysulfonate ether copolymer, AA::AHPSE 6:1 Mn 6,000

TABLE III

CaCO₃ Inhibition
Conditions: 1105 ppm Ca as CaCO₃, 1170 ppm CO₃ as CaCO₃,
pH 9.0, 70° C., 17 hour equilibration

| Example | Treatment | ppm Active | % Inhibition .5 | 1 | 2 |
|---|---|---|---|---|---|
| | HEDP | | 30 | 52 | 61 |
| | AA/HPA | | 5 | 23 | 34 |
| 1 | | | 0 | 20 | 36 |
| 2 | | | 6 | 26 | 38 |
| 3 | | | 11 | 30 | 34 |
| 4 | | | 4 | 30 | 41 |
| | AA/AHPSE | | 0 | 20 | 33 |

HEDP = hydroxyethylidenediphosphonic acid

TABLE IV

Montmorillonite Dispersion
Conditions: 200 ppm Ca as CaCO₃, 1000 ppm montmorillonite,
pH 7.0, 45° C., 10 mM NaHCO₃, 18 hours settling

| Example | Treatment | ppm Active | Δ% Transmittance 5 | 10 | 20 |
|---|---|---|---|---|---|
| | Polyacrylic acid | | 17 | 22 | 25 |
| | AA/HPA | | 25 | 30 | 33 |
| | AA/AHPSE | | 30 | 31 | 32 |
| 1 | | | 24 | 30 | 33 |
| 2 | | | 29 | 31 | 31 |
| 3 | | | 28 | 28 | 31 |
| 4 | | | 28 | 30 | 33 |

TABLE V

Ferric Hydroxide Dispersion
Conditions: 50 ppm Fe, 200 ppm Ca as CaCO₃, pH 8.0,
45° C., 17 hours equilibration

| Example | Treatment | ppm Active | Δ% Transmittance 5 | 10 | 20 |
|---|---|---|---|---|---|
| | Diisobutylene Maleic Anhydride Copolymer | | 3 | 17 | 44 |
| | AA/HPA | | 5 | 15 | 33 |
| | AA/AHPSE | | 2 | 7 | 28 |
| 1 | | | 2 | 7 | 21 |
| 2 | | | 2 | 6 | 15 |
| 3 | | | 3 | 4 | 9 |
| 4 | | | 2 | 3 | 7 |

TABLE VI

Magnesium Silicate Inhibition
Conditions: 80 ppm, Mg²⁺ as Ca CO₃, 150 ppm SiO₂,
pH 9.0, 70° C., 2 mM NaHCO₃, 17-hour equilibration

| Example | Treatment | ppm Active | % Inhibition* 5 | 20 | 40 |
|---|---|---|---|---|---|
| | HEDP | | 26 | 37 | 42 |
| | AA/AHPSE | | 5 | 12 | 20 |
| | AA/HPA | | 0 | 2 | 8 |

TABLE VI-continued

Magnesium Silicate Inhibition
Conditions: 80 ppm, Mg²⁺ as Ca CO₃, 150 ppm SiO₂,
pH 9.0, 70° C., 2 mM NaHCO₃, 17-hour equilibration

| Example | Treatment | ppm Active | % Inhibition* 5 | 20 | 40 |
|---|---|---|---|---|---|
| 1 | | | 3 | 4 | 14 |
| 2 | | | 0 | 6 | 14 |
| 3 | | | 2 | 7 | 20 |
| 4 | | | 4 | 11 | 18 |

*Average of two runs

TABLE VII

Manganese Inhibition
Conditions: 8 ppm Mn, 200 ppm Ca as CaCO₃, 304L S/S,
10 ppm treatment, 50° C., 26-hour equilibration

| Example | Treatment | % Inhibition |
|---|---|---|
| | AA/AHPSE | 85 |
| | AA/HPA | 85 |
| 1 | | 86 |
| 2 | | 87 |
| 3 | | 86 |
| 4 | | 87 |

TABLE VIII

Calcium Phosphonate Inhibition

| Treatment | ppm active | % Inhibition 5 | 10 | 15 | 20 |
|---|---|---|---|---|---|
| SS/MA | | −1 | 3 | 53 | 83 |
| AA/AHPSE (high viscosity) | | 0 | 92 | 100 | 95 |
| AA/AHPSE (low viscosity) | | −3 | 45 | 72 | 71 |
| Example 6 | | −3 | 11 | 62 | 81 |
| Example 7 | | 0 | 77 | 76 | 83 |
| Example 8 | | −4 | 75 | 82 | 84 |
| Example 9 | | −4 | −4 | 2 | 10 |

SS/MA = Sulfonated styrene/maleic anhydride copolymer

The procedures used for the above tests are detailed in U.S. Pat. Nos. 4,452,704 (Snyder et al.) and 4,759,851 (Chen). It is noted that in Tables IV and V, increasing Δ% Transmittance values indicate better treatment as more particles remain suspended in the aqueous medium.

BOILER STUDIES

In order to assess the efficacy of the polymers of the present invention in inhibiting scale formation in steam generating systems, research boilers were fitted with two 4,000 watt electrical heater probes, giving 185,000 BTU/ft²/hr and about 8 Kg/hr steam.

Results for the boiler experiments with a phosphate precipitation program at 900 psig are listed below. The feedwater contained 4 ppm of calcium and 2 ppm of magnesium (both as CaCO₃) and the boiler operated at approximately 15 cycles.

TABLE IX

Boiler Testing

| Treatment | Dosage (ppm Active) | Deposit Weight Density (g/ft²) |
|---|---|---|
| Control | 0 | 8.10 |
| Example 5 | 2.5 | 0.25 |
| Example 5 | 5.0 | 0.24 |
| Example 5 | 10.0 | 0.24 |

Under alkaline water conditions, the AA/AOP copolymer performs unexpectedly well as a scale and corrosion inhibitor. In accordance with these high pH cooling water system programs, the system water is supersaturated with respect to $CaCO_3$. The pH is maintained in a high range (i.e., 8.0 and above) with a minimum M alkalinity of 150 ppm and a maximum M alkalinity of 400 ppm. Due to such high alkalinity, scale deposition, primarily in the form of calcium carbonate, presents a significant problem. Heretofore, sulfonated copolymers, such as sulfonated styrene/maleic anhydride (SS/MA) and acrylic acid/allyl hydroxy propyl sulfonate ether (AA/AHPSE) have been successfully employed in such systems. However, we have discovered that the sulfonate group may be removed from the polymer compound without deleterious effect upon the function of the copolymer to inhibit corrosion formation and scale deposition. The copolymer of acrylic acid and 1-allyloxy-2-propanol (AA/AOP) has been found to function as well as either SS/MA or AA/AHPSE in these high pH cooling water systems. As an added benefit, the raw material cost for AA/AOP is significantly lower than the costs for either SS/MA or AA/AHPSE. Additionally, the AA/AOP copolymer helps maintain the zinc component of the treatment program in soluble ion form so it can perform its intended corrosion inhibiting function even at the high pH range (8.0 and above) of the treatment method.

As to the zinc compound which is to be employed, exemplary compounds include zinc oxide, zinc sulfate, zinc acetate, zinc chloride, zinc formate, zinc nitrate, zinc borate, zinc chromate, and zinc dichromate.

Compounds other than zinc which may be used in this invention include molybdate, chromate and manganese compounds.

In addition to the other high pH cooling water system treatment components (i.e., AA/AHPSE copolymer, $Zn^{+2}$, HEDP, optional chromate), especially in those cooling systems comprising copper, such as admiralty, binary brasses, binary bronzes, etc., it is desirable to add from about 0.2 to 30 ppm of an azole compound. Exemplary azole compounds include 1,2,3-tolytriazole; benzotriazole; 4-phenol-1,2,3triazole; 4-methyl-1,2,3-triazole; 4-ethyl-1,2,3-triazole; 5-ethyl-1,2,3-triazole; 5-propyl-1,2,3-triazole; and 5-butyl-1,2,3-triazole.

Other exemplary azole copper corrosion inhibitors comprise thiazole, 2-mercaptothiazole, 2-mercaptobenzothiazole, benzothiazole and the like.

In order to demonstrate the efficacy of the treatment of the present invention as corrosion and scale control agents for cooling water systems, especially in high alkaline conditions, tests were conducted in a recirculator test system. The detailed procedure has been described in U.S. Pat. Nos. 4,663,053 and 4,717,499. Exact water chemistry and test results are reported in Table X.

TABLE X

| Recirculator Test | |
|---|---|
| Test Conditions: | 120° F. bulk water temperature, 1.4 ft/sec water velocity pH 8.5, 15,600 $Btu/hr-ft^2$ heat flux, 160° tube temperature, 4-5 day test, 1.3 day retention time |
| Test Water: | 600 ppm $Ca^{+2}$ as $CaCO_3$, 200 ppm $Mg^{+2}$ as $CaCO_3$, 357 ppm $NaHCO_3$ M-alk = 220-250 ppm (as $CaCO_3$) |
| Treatment: | 15 ppm AA/AOP polymer* 6 ppm HEDP as $PO_4$ 3 ppm TTA (tolytriazole) 2 ppm Zinc |

| Treatment* | Corrosion Rate (mpy) | | |
|---|---|---|---|
| 15 ppm | LCS | ADM | Heat Exchange Tube Appearance |

TABLE X-continued

| Recirculator Test | | | |
|---|---|---|---|
| No polymer | — | — | heavy deposit |
| Example 6 | 0.67 | 0.46 | clean |
| Example 7 | 0.66 | 0.28 | clean, with minor pitting |
| Example 8 | 1.08 | 0.24 | clean |

*15 ppm is a standard dosage for this test. At lower dosage, some deposit may form on the heat exchange tube.
LCS = low carbon steel
ADM = admiralty brass While this invention has been described with respect to particular embodiments thereof, it is apparent that numerous other forms and modifications of this invention will be obvious to those skilled in the art. The appended claims and this invention generally should be construed to cover all such obvious forms and modification which are within the true spirit and scope of the present invention.

We claim:

1. A method for inhibiting corrosion and mineral deposition including calcium carbonate in a cooling water system comprising
   (a) maintaining the pH of said cooling water system at a minimum of 8;
   (b) maintaining said cooling water system in a state of super saturation with respect to calcium carbonate and operating said cooling water system at a Langelier Saturation Index maintained at a minimum level of 0.8;
   (c) adding to said cooling water system, about 0.1–500 ppm of a water soluble polymeric corrosion inhibitor and deposition control agent, having repeat units x and y comprising the structure:

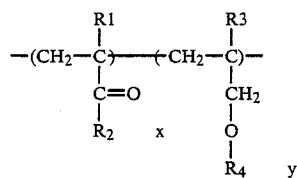

wherein
   R1 and R3 are independently hydrogen or lower alkyl group (C1–C3);
   R2 is OH or OM;
   M is a water soluble cation;
   R4 is 2 hydroxypropyl the molar ratio of said repeat units x:y is from about 8:1 to about 1:5;
   (d) adding to said cooling water system a water soluble zinc salt at a concentration of from about 0.1–15 ppm;
   (e) adding to said cooling water system a water soluble phosphonate compound at a concentration of about 6 ppm.

2. A method according to claim 1 wherein said water soluble phosphonate compound is an organic phosphorus acid.

3. A method according to claim 2 wherein said organic phosphorus acid comprises hydroxyethylidene diphosphonic acid.

4. A method according to claim 1 wherein said repeat units of said polymeric corrosion inhibitor and deposition control agent have the formula:

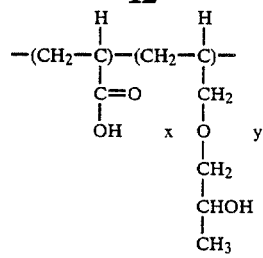
5. A method according to claim 4 wherein said repeat unit x is acrylic acid and said repeat unit y is 1-allyloxy-2-propanol.
6. A method according to claim 1 further comprising adding from about 0.2–30 ppm of an azole compound to said cooling water system.
7. A method according to claim 1 further comprising adding a water soluble molybdate salt.
* * * * *